(12) United States Patent
Shirasaka et al.

(10) Patent No.: US 9,845,869 B2
(45) Date of Patent: Dec. 19, 2017

(54) VEHICLE DRIVE APPARATUS

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Haruki Shirasaka, Chiryu (JP); Yuji Iwatsuru, Nishio (JP); Tetsuya Maruyama, Okazaki (JP); Kozo Yamamoto, Nagoya (JP); Hirofumi Nakada, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/104,715

(22) PCT Filed: Jan. 8, 2015

(86) PCT No.: PCT/JP2015/050417
§ 371 (c)(1),
(2) Date: Jun. 15, 2016

(87) PCT Pub. No.: WO2015/107979
PCT Pub. Date: Jul. 23, 2015

(65) Prior Publication Data
US 2016/0319930 A1 Nov. 3, 2016

(30) Foreign Application Priority Data
Jan. 17, 2014 (JP) .................. 2014-006773

(51) Int. Cl.
*F16H 61/00* (2006.01)
*F04B 41/06* (2006.01)
(Continued)

(52) U.S. Cl.
CPC ......... *F16H 61/0031* (2013.01); *F04B 41/06* (2013.01); *F16H 57/0441* (2013.01);
(Continued)

(58) Field of Classification Search
CPC ...... F16H 61/0031; F16H 47/08; F04B 31/06; Y10T 137/86131
See application file for complete search history.

(56) References Cited

U.S. PATENT DOCUMENTS 6,350,108 B1   2/2002  Haupt
8,506,454 B2*  8/2013  Shimizu et al. .... F16H 61/0206
                                              477/156

(Continued)

FOREIGN PATENT DOCUMENTS

JP    2008-267505 A    11/2008
JP    2010-236581 A    10/2010
(Continued)

OTHER PUBLICATIONS

Jun. 27, 2017 Extended Search Report issued in European Patent Application No. 15737081.8.

*Primary Examiner* — Kevin Lee
(74) *Attorney, Agent, or Firm* — Oliff PLC

(57) ABSTRACT

A mechanical oil pump, an electric oil pump, and a strainer are disposed inside a transmission case. As a suction oil passage that returns an excess hydraulic pressure in a hydraulic control device to the mechanical oil pump, a common oil passage extending from the hydraulic control device, a branch point, a first oil passage extending from the branch point to the mechanical oil pump, and a second oil passage extending from the branch point to the electric oil pump are formed in the transmission case. A meeting point where an inlet oil passage for suctioning oil via the strainer and the first oil passage of the suction oil passage meet is formed inside a pump body of the mechanical oil pump.

(Continued)

Accordingly, the suction oil passage of the mechanical oil pump and an inlet oil passage of the electric oil pump have a portion in common.

15 Claims, 11 Drawing Sheets

(51) Int. Cl.
  *F16H 57/04* (2010.01)
  *F16H 47/08* (2006.01)
(52) U.S. Cl.
  CPC .......... *F16H 47/08* (2013.01); *F16H 57/0489* (2013.01); *Y10T 137/86131* (2015.04)

(56) References Cited

U.S. PATENT DOCUMENTS

| | | | |
|---|---|---|---|
| 9,108,499 B2* | 8/2015 | Long et al. | ............... B60K 6/48 |
| 2008/0256943 A1 | 10/2008 | Shimizu et al. | |
| 2010/0242669 A1 | 9/2010 | Komizo et al. | |
| 2016/0281842 A1 | 9/2016 | Fukui et al. | |

FOREIGN PATENT DOCUMENTS

| | | | |
|---|---|---|---|
| JP | 2012-172766 A | 9/2012 |
| JP | 2013-241992 A | 12/2013 |
| WO | 2015/030110 A1 | 3/2015 |

\* cited by examiner

VEHICLE DRIVE APPARATUS

TECHNICAL FIELD

The present technique relates to a vehicle drive apparatus such as an automatic transmission that is mounted on a vehicle having an idle stop function, for example, and particularly relates to a vehicle drive apparatus including a mechanical oil pump that is driven by an internal combustion engine and an electric oil pump that is electrically driven.

BACKGROUND ART

In recent years, in order to improve the fuel efficiency and other performances of vehicles, development has been carried out on a vehicle having an idling stop function that stops the internal combustion engine when the vehicle is stationary. An automatic transmission mounted on such a vehicle having the idling stop function is provided with an electric oil pump that is electrically driven independently of a mechanical oil pump that is driven by the internal combustion engine, in order to prevent delay in supplying an engagement pressure to a clutch, a brake, and so on when starting the internal combustion engine to start the vehicle. Thus, even when the internal combustion engine is not in running, a hydraulic pressure is supplied from the electric oil pump.

On the other hand, the mainstream automatic transmissions have been automatic transmissions for typical conventional vehicles, that is, vehicles without the idling stop function, and therefore are not designed to have an electric oil pump mounted thereon. In the case of mounting such an automatic transmission on a vehicle with the idling stop function, it has been common to attach an electric oil pump externally to a transmission case of the automatic transmission (see, for example, Patent Document 1).

RELATED-ART DOCUMENTS

Patent Documents

[Patent Document 1] Japanese Patent Application Publication No. 2010-236581 (JP 2010-236581 A)

PROBLEM TO BE SOLVED

Recently, however, development based on provision of an idling stop function has been becoming the mainstream in development of vehicles. Therefore, it is preferable to design an automatic transmission that is mounted on such a vehicle with the idling stop function as described above, based on the assumption that an electric oil pump is mounted. Thus, an automatic transmission may be designed such that an electric oil pump is disposed inside a transmission case of the automatic transmission. However, if an electric oil pump is disposed inside a transmission case, the transmission case needs to have a space therein not only for the electric oil pump itself, but also for various oil passages communicating with the electric oil pump. This might result in an increase in the size of the automatic transmission.

In view of the above, it is an object of preferred embodiments to provide a vehicle drive apparatus that is prevented from being increased in size by appropriately arranging oil passages even though a mechanical oil pump and an electric oil pump are disposed in a case.

MEANS FOR SOLVING THE PROBLEM

A vehicle drive apparatus (see, for example, FIGS. 1 through 10) including:
a case that accommodates a transmission apparatus;
a mechanical oil pump that is disposed in the case and is driven by an internal combustion engine;
an electric oil pump that is disposed in the case and is electrically driven;
a hydraulic control device that is joined and attached to the case, and hydraulically controls the transmission apparatus based on hydraulic pressures generated by the mechanical oil pump and the electric oil pump;
a strainer that is disposed inside the case;
a first discharge oil passage that supplies the hydraulic pressure discharged by the mechanical oil pump to the hydraulic control device;
a second discharge oil passage that supplies the hydraulic pressure discharged by the electric oil pump to the hydraulic control device; and
a suction oil passage that returns an excess hydraulic pressure in the hydraulic control device to the mechanical oil pump and the electric oil pump, wherein:
the suction oil passage includes a common oil passage extending from the hydraulic control device to an inside of the case, a branch point where the common oil passage splits toward the mechanical oil pump and the electric oil pump, a first oil passage extending from the branch point to the mechanical oil pump, and a second oil passage extending from the branch point to the electric oil pump, and the common oil passage, the branch point, the first oil passage, and the second oil passage are formed in the case;
the mechanical oil pump includes a hydraulic pressure generating unit that generates the hydraulic pressure, and a pump body which contains the hydraulic pressure generating unit and in which an inlet port for suctioning oil from an oil reservoir via the strainer, a discharge port communicating with the first discharge oil passage, and a suction connection port communicating with the first oil passage of the suction oil passage are formed; and
a meeting point where the inlet port and the suction connection port meet is provided inside the pump body.

Thus, the common oil passage, the branch point, the first oil passage, and the second oil passage of the suction oil passage are formed in the case, and the meeting point where the inlet port for suctioning oil via the strainer and the suction connection port communicating with the first oil passage of the suction oil passage meet is provided inside the pump body of the mechanical oil pump. Accordingly, the suction oil passage of the mechanical oil pump and the inlet oil passage of the electric oil pump can have a portion in common, and therefore it is possible to prevent an increase in the size of the automatic transmission. Further, the meeting point where the inlet port and the suction connection port meet is provided inside the pump body of the mechanical oil pump. Accordingly, the arrangement of oil passages inside the case is improved compared to the case where, for example, an inlet oil passage for guiding oil from the strainer to the mechanical oil pump is diverted to the suction oil passage and then connected, and therefore it is possible to prevent an increase in the size of the automatic transmission.

MODES FOR CARRYING OUT THE DESCRIPTION

Figure 1:
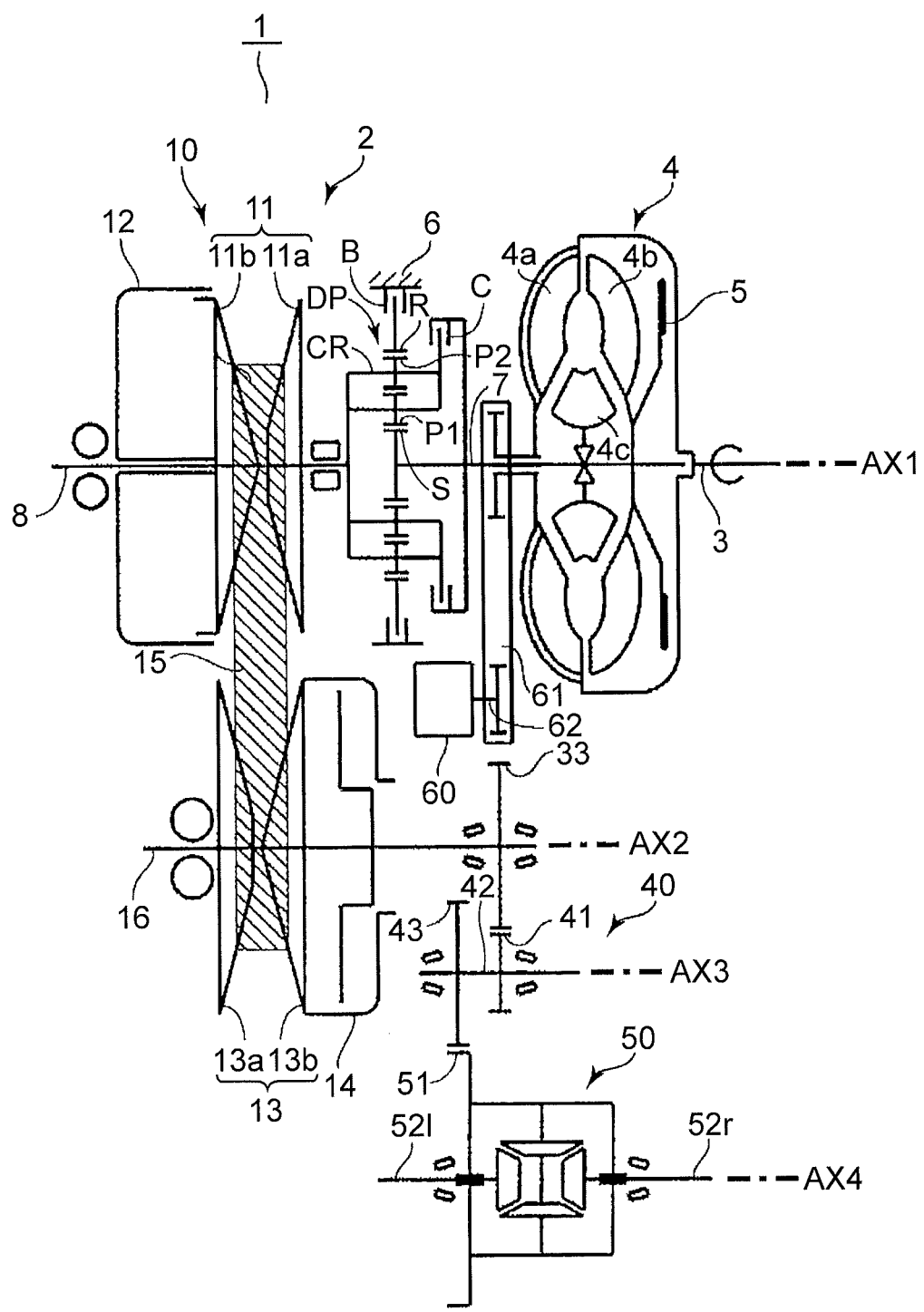
FIG. 1 is a skeleton diagram illustrating an automatic transmission according to an embodiment.

An embodiment will be described with reference to the drawings. First, the schematic structure of an automatic transmission (vehicle drive apparatus) 1 will be described with reference to FIG. 1.

The automatic transmission 1 is structured to have four mutually parallel axes, namely, a first axis AX1 through a fourth axis AX4. On the first axis AX1 coaxial with an output shaft (crank shaft) of an internal combustion engine, there are disposed an input shaft 3 of the automatic transmission 1 coupled to the output shaft, a torque converter 4 with a lock-up clutch, an input shaft 7 of a speed change mechanism (transmission apparatus) 2, a planetary gear DP serving as a forward/reverse drive switching device, a clutch C, a brake B, a primary pulley 11 of a belt-type continuously variable transmission device 10.

Further, a secondary pulley 13 of the belt-type continuously variable transmission device 10 is disposed on the second axis AX2, and a counter shaft unit 40 is disposed on the third axis AX3. Further, a differential device 50, left and right drive shafts 52*l* and 52*r* are disposed on the fourth axis AX4.

The input shaft 3 is connected to a pump impeller 4*a* of the torque converter 4. The torque converter 4 generally includes the pump impeller 4*a*, a turbine runner 4*b* that is disposed to face the pump impeller 4*a* and is connected to the input shaft 7 of the speed change mechanism 2, a stator 4*c* that is disposed therebetween and is connected to a one-way clutch supported by a transmission case (case) 6, and a lock-up clutch 5 that directly connects the input shaft 3 and the input shaft 7 when engaged. The torque converter 4 is structured to be filled with oil so as to be in an oil-tight state. The pump impeller 4*a* is connected to a mechanical oil pump 60, which will be described below in detail, via a chain 61 and a drive shaft 62.

The input shaft 7 is connected to a sun gear S of the planetary gear DP. The planetary gear DP is a so-called double-pinion type planetary gear that includes the sun gear S, a ring gear R, and a carrier CR that rotatably supports a pinion P1 meshing with the sun gear S and a pinion P2 meshing with the ring gear R. Of these, the ring gear R is structured such that its rotation with respect to the transmission case 6 can be locked by the brake B. Further, the sun gear S is directly coupled to the input shaft 7, and the carrier CR is structured to be connectable to the input shaft 7 via the clutch C.

On the other hand, the belt-type continuously variable transmission device 10 includes the primary pulley 11 that rotates together with a central shaft 8 connected to the carrier CR, the secondary pulley 13, and an endless belt 15 that is wound around the primary pulley 11 and the secondary pulley 13. The primary pulley 11 includes a fixed sheave 11*a* and a movable sheave 11*b* having conical wall surfaces facing each other. The fixed sheave 11*a* is fixed so as not to be axially movable with respect to the central shaft 8. The movable sheave 11*b* is supported so as to be axially movable with respect to the central shaft 8. The belt 15 is held in a groove portion with a V-shaped cross section defined by the fixed sheave 11*a* and the movable sheave 11*b*. Similarly, the secondary pulley 13 includes a fixed sheave 13*a* and a movable sheave 13*b* having conical wall surfaces facing each other. The fixed sheave 13*a* is fixed so as not to be axially movable with respect to a central shaft 16. The movable sheave 13*b* is supported so as to be axially movable with respect to the central shaft 16. The belt 15 is held in a groove portion with a V-shaped cross section defined by the fixed sheave 13*a* and the movable sheave 13*b*. The fixed sheave 11*a* of the primary pulley 11 and the fixed sheave 13*a* of the secondary pulley 13 are disposed so as to be on the axially opposite sides of the belt 15.

Further, a hydraulic servo 12 is disposed on the rear side of the movable sheave 11*b* of the primary pulley 11, and a hydraulic servo 14 is disposed on the rear side of the movable sheave 13*b* of the secondary pulley 13. The hydraulic servos 12 and 14 are structured to generate a belt clamping force corresponding to a load torque and to generate a clamping force for changing or fixing the speed ratio when a hydraulic pressure is supplied thereto.

A counter gear 33 is fixed on an end of the central shaft 16 on the torque converter 4 side in the axial direction, and meshes with a drive gear 41 of the counter shaft unit 40. The counter shaft unit 40 includes a counter shaft 42, the drive gear 41 fixed and coupled to the counter shaft 42, a driven gear 43 fixed to and coupled to the counter shaft 42. The driven gear 43 meshes with a differential ring gear 51 of the differential device 50.

The differential device 50 is structured such that rotation of the differential ring gear 51 is transmitted to the left and right drive shafts 52*l* and 52*r* while absorbing the difference in rotation speed therebetween. The left and right drive shafts 52*l* and 52*r* are coupled to left and right wheels (not illustrated), respectively. Note that the differential ring gear 51 meshes with the driven gear 43, and the drive gear 41 meshes with the counter gear 33. Accordingly, the central shaft 16, the counter shaft 42 of the counter shaft unit 40, and the differential device 50 are drivingly coupled to the wheels via the left and right drive shafts 52*l* and 52*r*, that is, are always interlocked with the wheels.

The following describes the operation of the automatic transmission 1. For example, when a vehicle equipped with the automatic transmission 1 travels forward in a forward direction, the brake B is released and the clutch C is engaged. Thus, the input rotation that is input from the internal combustion engine to the input shaft 7 via the torque converter 4 or the lock-up clutch 5 is transmitted to the primary pulley 11 via the planetary gear DP placed in a directly coupled state, and then transmitted from the primary pulley 11 to the secondary pulley 13 via the belt 15 as a continuously variable rotation at a continuously variable speed. Further, the continuously variable rotation is transmitted from the central shaft 16 to the counter gear 33. The continuously variable rotation transmitted to the counter gear 33 is transmitted to the drive gear 41 of the counter shaft unit 40, and then transmitted to the differential ring gear 51 of the differential device 50 at a speed reduced by the driven gear 43. Thus, a normal rotation with a variable speed ratio in a continuously variable transmission mode is output to the wheels via the left and right drive shafts 52*l* and 52*r*.

On the other hand, when the vehicle equipped with the automatic transmission 1 travels in reverse in a backward direction, the clutch C is released and the brake B is locked. Then, the input rotation that is input from the internal combustion engine to the input shaft 7 via the torque converter 4 or the lock-up clutch 5 is reversed by the fixed ring gear R with the input rotation of the sun gear S stopped and output as a reverse rotation from the carrier CR in the planetary gear DP, due to the engagement of the brake B. Thus, the reverse rotation is transmitted to the primary pulley 11, and then transmitted from the primary pulley 11 to the secondary pulley 13 via the belt 15 as a continuously variable reverse rotation at a continuously variable speed. Further, the continuously variable reverse rotation is transmitted from the central shaft 16 to the counter gear 33. The continuously variable reverse rotation transmitted to the counter gear 33 is transmitted to the drive gear 41 of the counter shaft unit 40, and then transmitted to the differential ring gear 51 of the differential device 50 at a speed reduced by the driven gear 43. Thus, a reverse rotation with a variable speed ratio in a reverse mode is output to the wheels via the left and right drive shafts 52*l* and 52*r*.

The following describes the arrangement of the mechanical oil pump 60, an electric oil pump 70, and oil passages in the automatic transmission 1. First, the arrangement structure of a related-art automatic transmission will be described with reference to FIG. 11.

Figure 11:
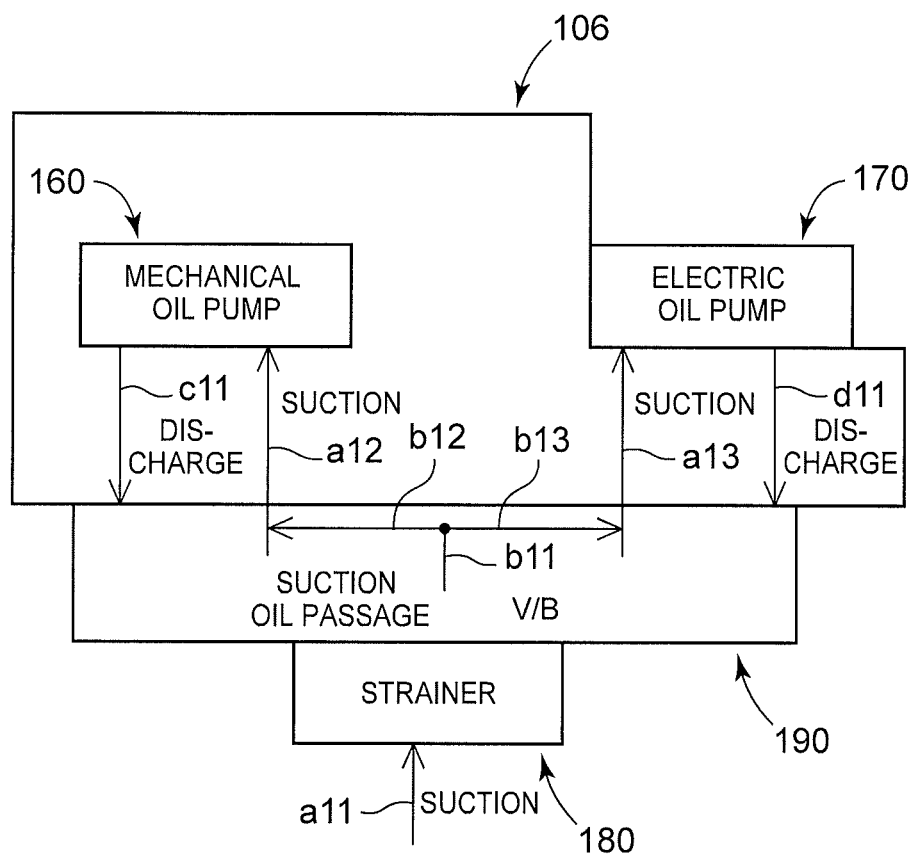
FIG. 11 is a schematic view illustrating an oil passage structure of a related-art automatic transmission.

As illustrated in FIG. 11, in the related-art automatic transmission, a mechanical oil pump 160 that is driven by an internal combustion engine is disposed inside a transmission case 106, and an electric oil pump 170 that is electrically driven is externally attached to a side surface of the transmission case 106. Further, a hydraulic control device (V/B) 190 is joined and attached on the lower side of the transmission case 106. Further, a strainer 180 housed in an oil pan (not illustrated) is attached under the hydraulic control device 190.

In this related-art automatic transmission, oil is suctioned from an inlet oil passage a11 of the strainer 180. The oil suctioned from the inlet oil passage a11 passes through the inside of the transmission case 106 and is sent to an inlet oil passage a12 of the mechanical oil pump 160 and an inlet oil passage a13 of the electric oil pump 170. On the other hand, as for a suction oil passage that discharges an excess pressure of a primary regulator valve and a secondary regulator valve, for example, an oil passage b11 splits into an oil passage b12 and an oil passage b13 in the hydraulic control device 190. The oil passage b12 and the oil passage b13 meet the inlet oil passage a12 of the mechanical oil pump 160 and the inlet oil passage a13 of the electric oil pump 170, respectively.

When the mechanical oil pump 160 is driven while the internal combustion engine is driven, oil is suctioned from the inlet oil passage a12 together with an excess pressure, so that the mechanical oil pump 160 generates a hydraulic pressure. Then, the hydraulic pressure is supplied to the hydraulic control device 190 via a discharge oil passage c11. Further, for example, when the mechanical oil pump 160 is stopped and the electric oil pump 170 is driven while the internal combustion engine is stopped, oil is suctioned from the inlet oil passage a13 together with an excess pressure, so that the electric oil pump 170 generates a hydraulic pressure. Then, the hydraulic pressure is supplied to the hydraulic control device 190 via a discharge oil passage d11.

In the related-art automatic transmission described above, since the oil suctioned from the strainer 180 passes through the hydraulic control device 190, the two inlet oil passages a12 and a13 for guiding the oil from the hydraulic control device 190 to the mechanical oil pump 160 and the electric oil pump 170 are provided, and the oil passages b11 through b13 serving as suction oil passages are disposed inside the hydraulic control device 190. In this structure, if the electric oil pump 170 is housed inside the transmission case 106, the inlet oil passage a13 and the discharge oil passage d11 pass through the joining section between the hydraulic control device 190 and the transmission case 106, so that the area of the joining section is increased. Further, the arrangement of the suction oil passages inside the hydraulic control device 190 becomes complicated, which hampers a reduction in the size of the hydraulic control device 190.

Next, the arrangement structure of the automatic transmission 1 according to the present embodiment will be described with reference to FIG. 10. As illustrated in FIG. 10, in the automatic transmission 1, a strainer 80 is disposed inside the transmission case 6 such that the oil from the strainer 80 is supplied directly to the mechanical oil pump 60 via an inlet oil passage a1. Further, for example, a suction oil passage that returns an excess pressure (excess hydraulic pressure) from a primary regulator valve and a secondary regulator valve to the mechanical oil pump 60 and the electric oil pump 70 is guided by a common oil passage b1 from a hydraulic control device 90 to the inside of the transmission case 6, and splits into two at a branch point B. One is guided to the mechanical oil pump 60 by a first oil passage b2, while the other is guided to the electric oil pump 70 by a second oil passage b3. The first oil passage b2 meets the inlet oil passage a1 at a meeting point C inside a pump body 60B (see FIG. 9) of the mechanical oil pump 60, so that the oil suctioned from the strainer 80 is used together with the excess pressure as oil to be suctioned into the mechanical oil pump 60. Further, since the suction oil passage a1 meets the first oil passage b2, the oil suctioned from the strainer 80 is used together with the excess pressure as oil to be suctioned into the electric oil pump 70 via the second oil passage b3.

When the mechanical oil pump 60 is driven while the internal combustion engine is driven, oil is suctioned from the inlet oil passage a1 and the first oil passage b2 together with an excess pressure, so that the mechanical oil pump 60 generates a hydraulic pressure. Then, the hydraulic pressure is supplied to the hydraulic control device 90 via first discharge oil passages c1 and c2. Further, for example, when the mechanical oil pump 60 is stopped and the electric oil pump 70 is driven while the internal combustion engine is stopped, oil is suctioned from the inlet oil passage a1, the first oil passage b2, and the second oil passage b3, so that the electric oil pump 70 generates a hydraulic pressure. Then, the hydraulic pressure is supplied to the hydraulic control device 90 via a second discharge oil passage d1.

Figure 2:
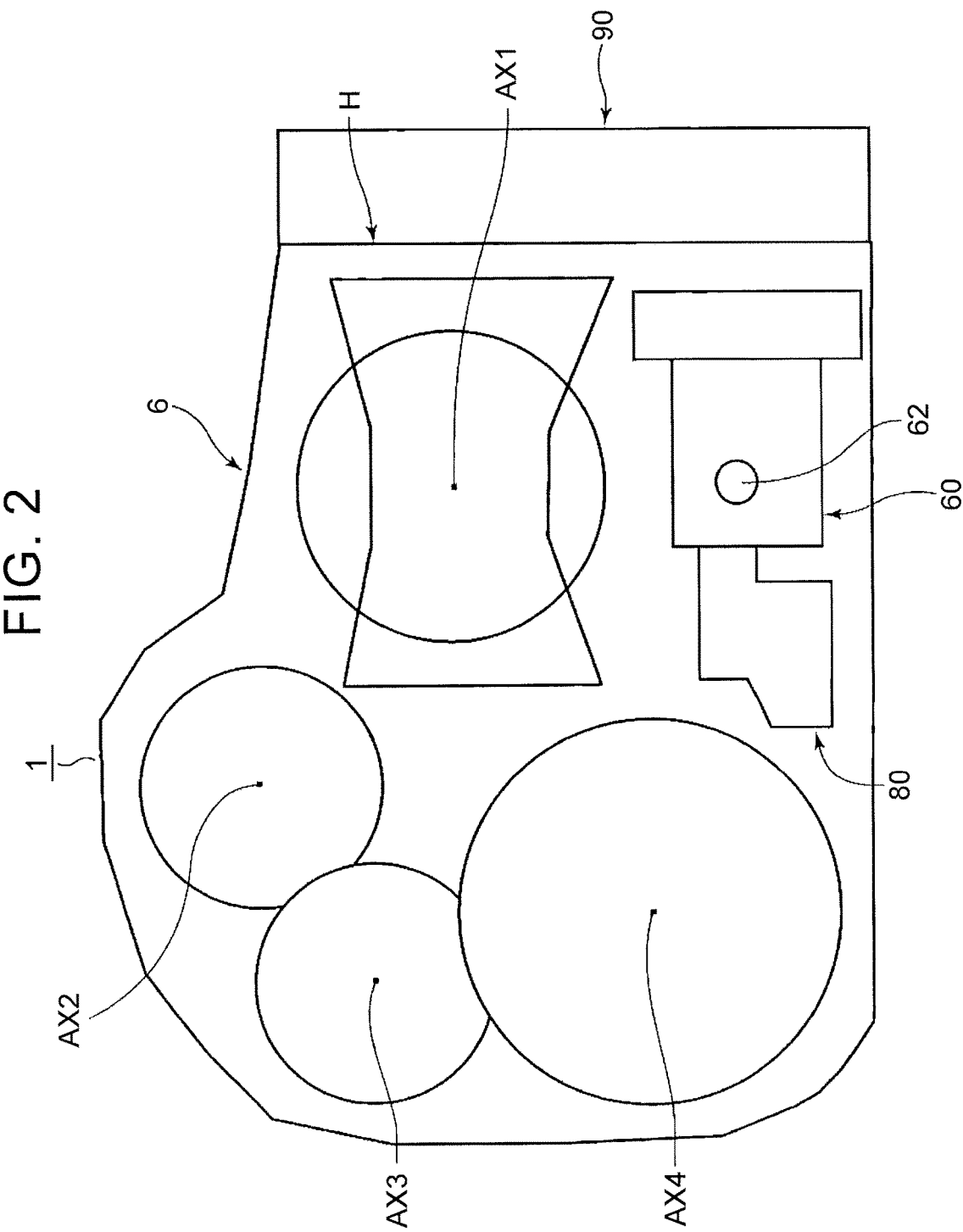
FIG. 2 is a schematic front view with a torque converter of the automatic transmission removed.

In the following, the detailed structure of the automatic transmission 1 will be described with reference to FIGS. 2 through 9. FIG. 2 is a schematic front view (a view as viewed from the internal combustion engine side in the axial direction), wherein the torque converter 4 of the automatic transmission 1 and a housing case (not illustrated) accommodating the torque converter 4 are removed. As illustrated in FIG. 2, the automatic transmission 1 is disposed inside the transmission case 6, and the first axis AX1 through the fourth axis AX4 of the speed change mechanism 2 described above are arranged in a substantially C shape as viewed in the axial direction. The mechanical oil pump 60 (see FIG. 1) including the drive shaft 62 that is coupled to the chain 61 via a sprocket is disposed under the first axis AX1. Further, an oil reservoir for sealed oil is formed at the lower part in the transmission case 6, and the strainer 80 is disposed between the mechanical oil pump 60 and the fourth axis AX4 so as to be soaked in the oil reservoir. On the other hand, on a side surface of the transmission case 6 at the vehicle front side, the hydraulic control device 90 is joined and attached to the transmission case 6 in a joining section H. Note that, in the automatic transmission 1, the hydraulic control device 90 is joined and attached to the side surface of the transmission case 6 at the vehicle front side. However, the structure is not limited thereto. The hydraulic control device 90 may be joined to a side surface of the transmission case 6 at the vehicle rear side. In particular, in the case of a structure in which an oil reservoir is formed inside the transmission case 6, the hydraulic control device 90 may be attached to any part other than the lower side of the transmission case 6.

Figure 3:
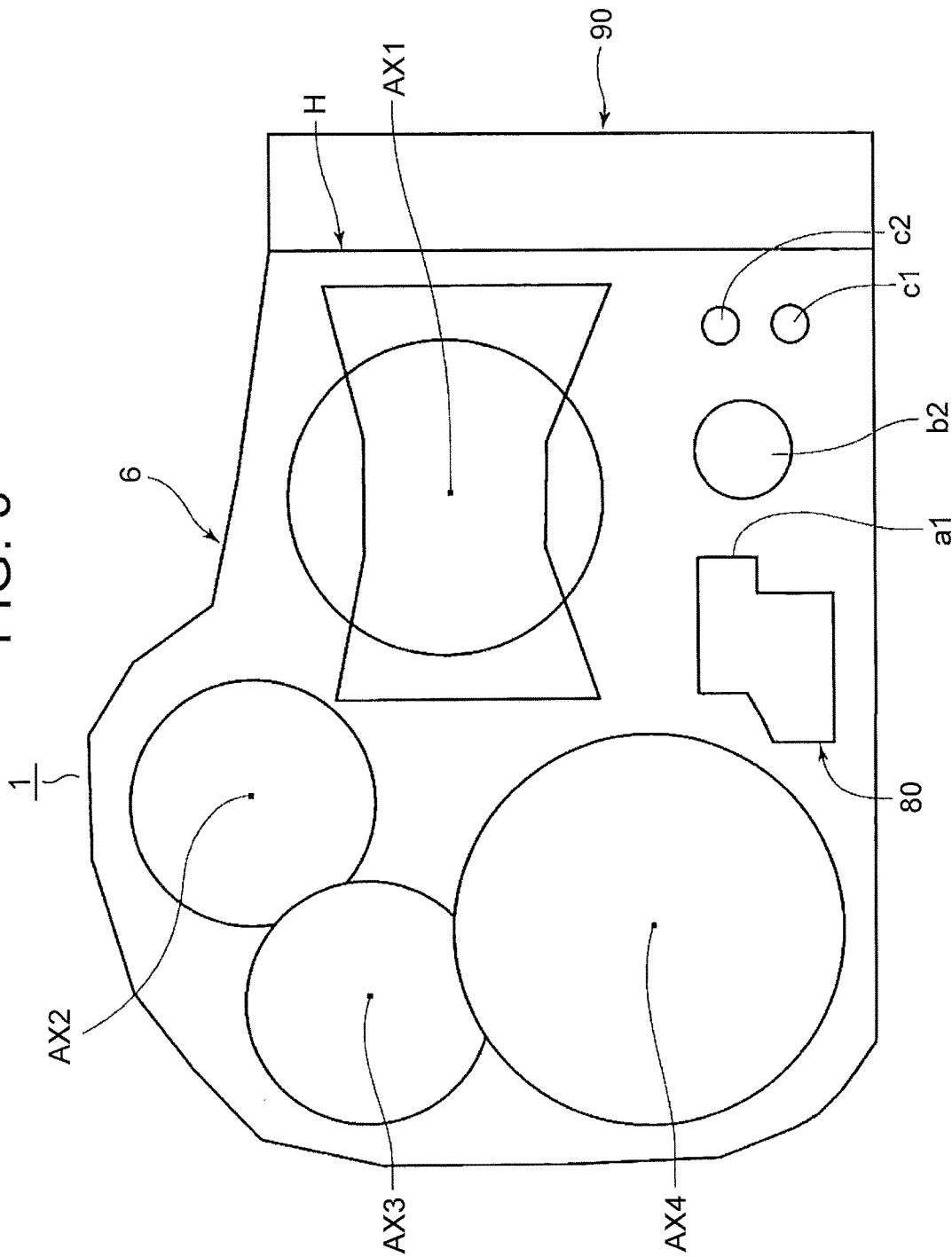
FIG. 3 is a schematic front view with a mechanical oil pump of FIG. 2 removed.

FIG. 3 is a schematic front view with the mechanical oil pump 60 of FIG. 2 removed. As illustrated in FIG. 3, the inlet oil passage a1 is connected from the strainer 80 directly to the mechanical oil pump 60. Further, in the transmission case 6, a connection portion of the first oil passage b2 of the suction oil passage is formed toward the mechanical oil pump 60 (toward the internal combustion engine side in the axial direction), and connection portions of the first discharge oil passages c1 and c2 are formed toward the mechanical oil pump 60 (toward the internal combustion engine side in the axial direction).

Figure 8:
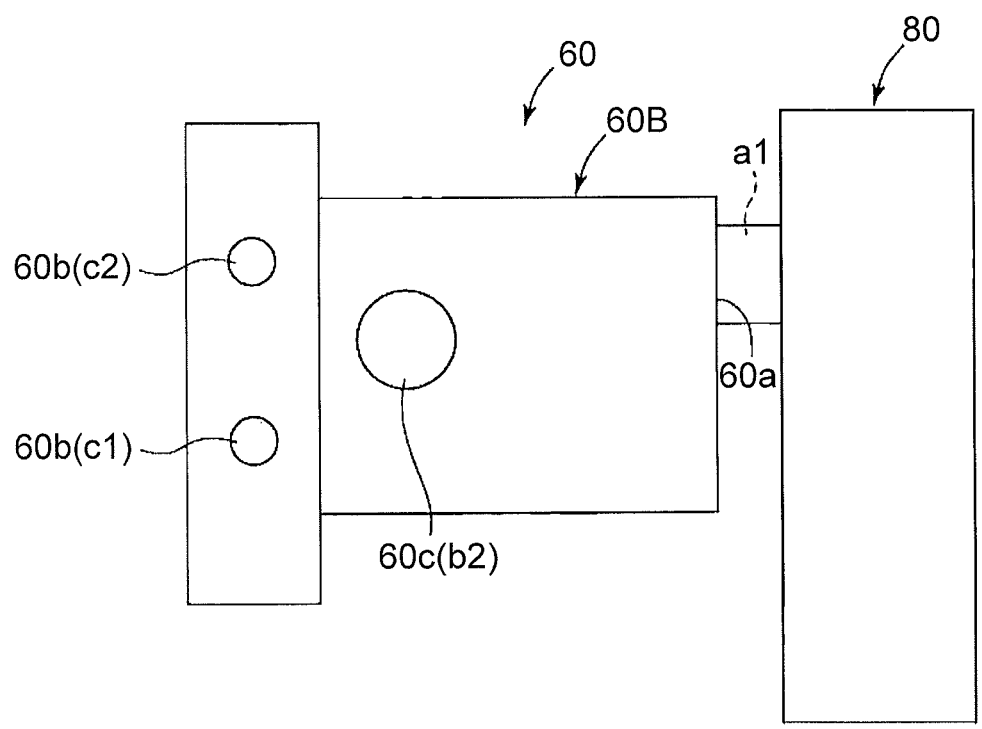
FIG. 8 is a schematic view illustrating the mechanical oil pump.
Figure 9:
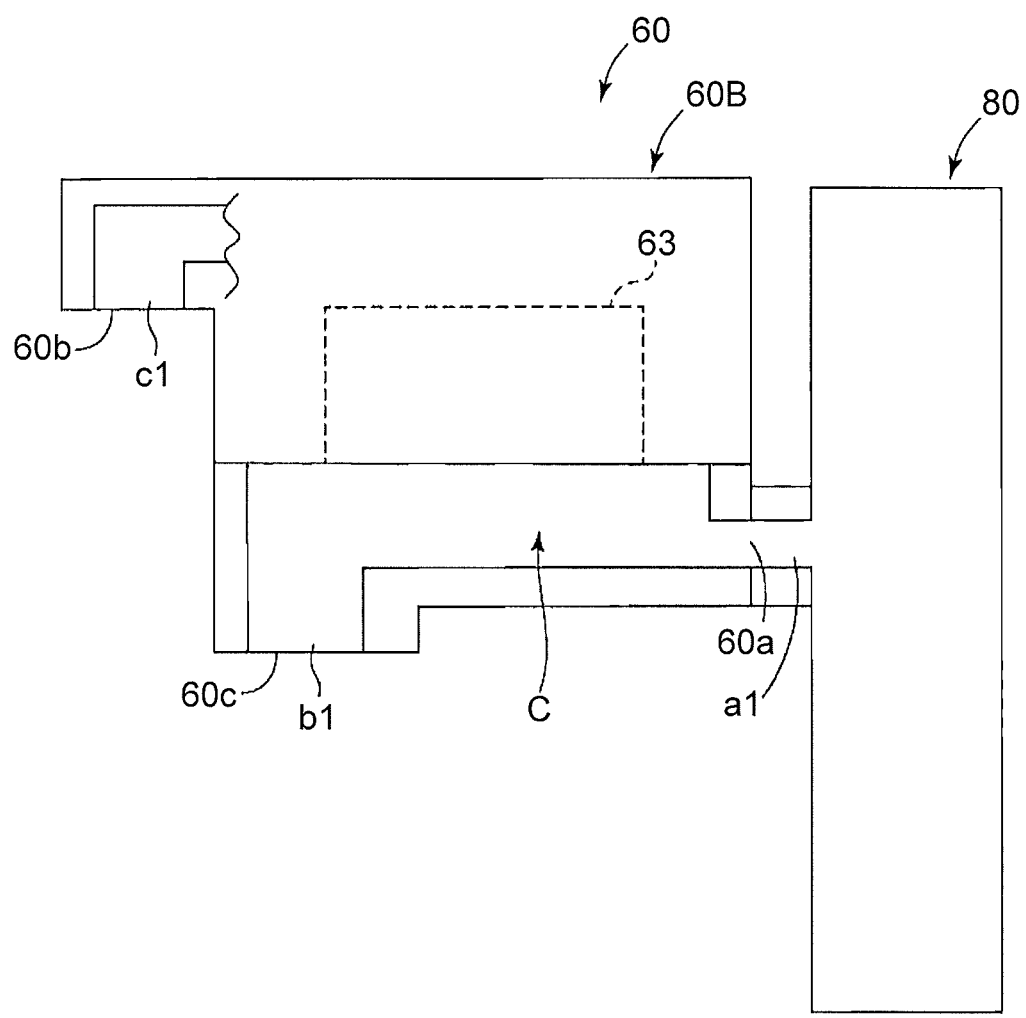
FIG. 9 is a schematic cross-sectional view illustrating the mechanical oil pump.
Figure 10:
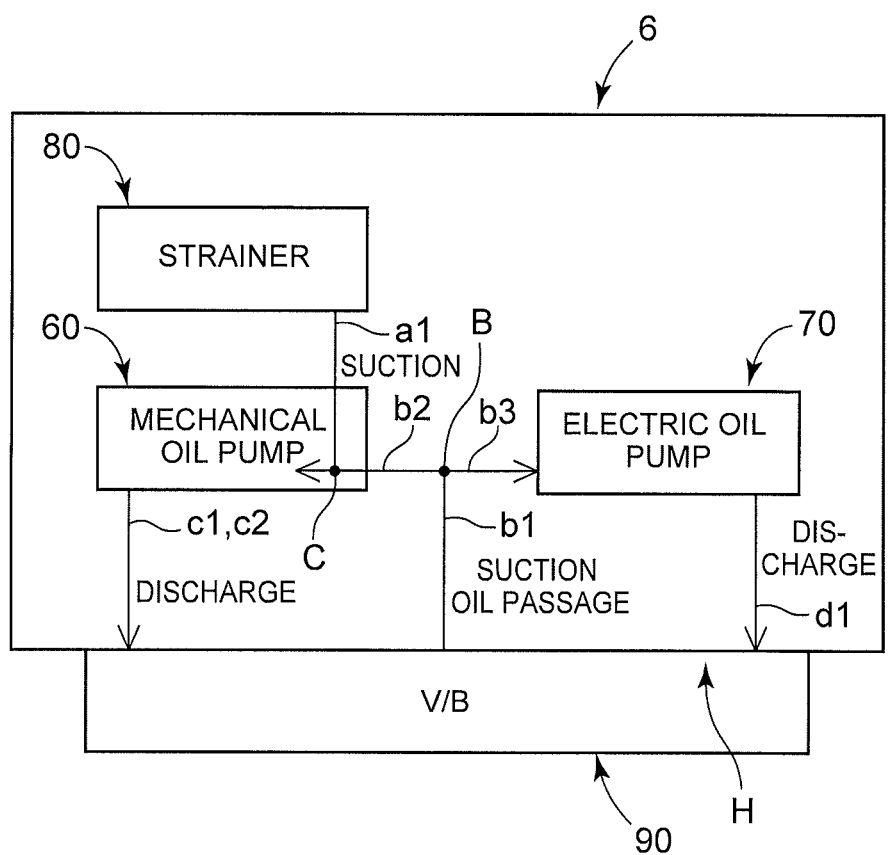
FIG. 10 is a schematic view illustrating an oil passage structure of the automatic transmission.

FIG. 8 is a schematic view of the mechanical oil pump 60, and FIG. 9 is a schematic cross-sectional view illustrating the mechanical oil pump 60. As illustrated in FIGS. 8 and 9, the mechanical oil pump 60 includes the pump body 60B containing an internal gear pump 63 serving as a hydraulic pressure generating unit. At an end on one side of the pump body 60B, an inlet port 60a to which the inlet oil passage a1 from the strainer 80 is connected is formed. Further, at another side of the pump body 60B, a suction connection port 60c that is connected to the first oil passage b2 of the suction oil passage and discharge ports 60b and 60b that are connected respectively to the first discharge oil passages c1 and c2 are formed so as to face the center side of the automatic transmission 1 (so as to face the opposite side of the internal combustion engine in the axial direction) when the mechanical oil pump 60 is mounted on the automatic transmission 1.

The inlet port 60a and the suction connection port 60c of the mechanical oil pump 60 are disposed on the side of the branch point B (see FIG. 7) of the suction oil passage with respect to the internal gear pump 63. The meeting point C where the inlet oil passage a1 and the first oil passage b2 of the suction oil passage meet is formed inside the pump body 60B. That is, as illustrated in FIG. 9, since the inlet port 60a and the suction connection port 60c are gathered on one side of the internal gear pump 63, the inlet oil passage a1 and the first oil passage b2 of the suction oil passage are connected in a short distance without diverting the inlet oil passage a1 and the first oil passage b2 of the suction oil passage. Further, on the side opposite to the meeting point C with respect to the internal gear pump 63, the first discharge oil passages c1 and c2 extend from the internal gear pump 63, and the discharge ports 60b are formed in the same direction as the suction connection port 60c, that is, toward the center side of the automatic transmission 1. Thus, the length of the first discharge oil passages c1 and c2 formed inside the transmission case 6 is reduced.

Figure 4:
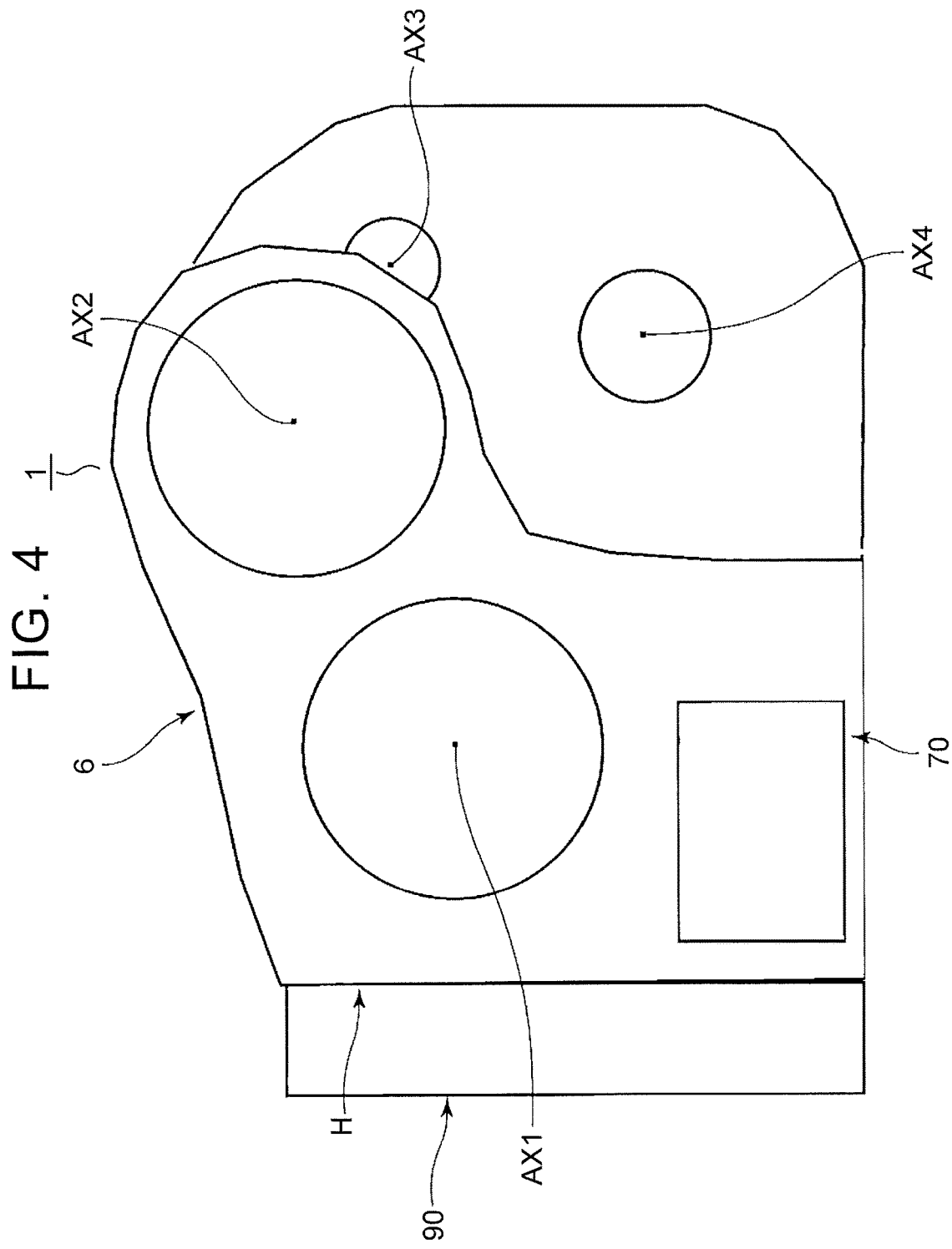
FIG. 4 is a schematic rear view with a rear cover of the automatic transmission removed.

FIG. 4 is a schematic rear view (a view as viewed from the side opposite to the internal combustion engine side in the axial direction) with a rear cover (not illustrated) of the automatic transmission 1 removed. As illustrated in FIG. 4, the electric oil pump 70 is disposed under the first axis AX1 of the speed change mechanism 2, that is, in a position facing the mechanical oil pump 60 in the axial direction, in the transmission case 6. Note that the electric oil pump 70 includes a vane pump serving as a hydraulic pressure generating unit, for example.

Figure 5:
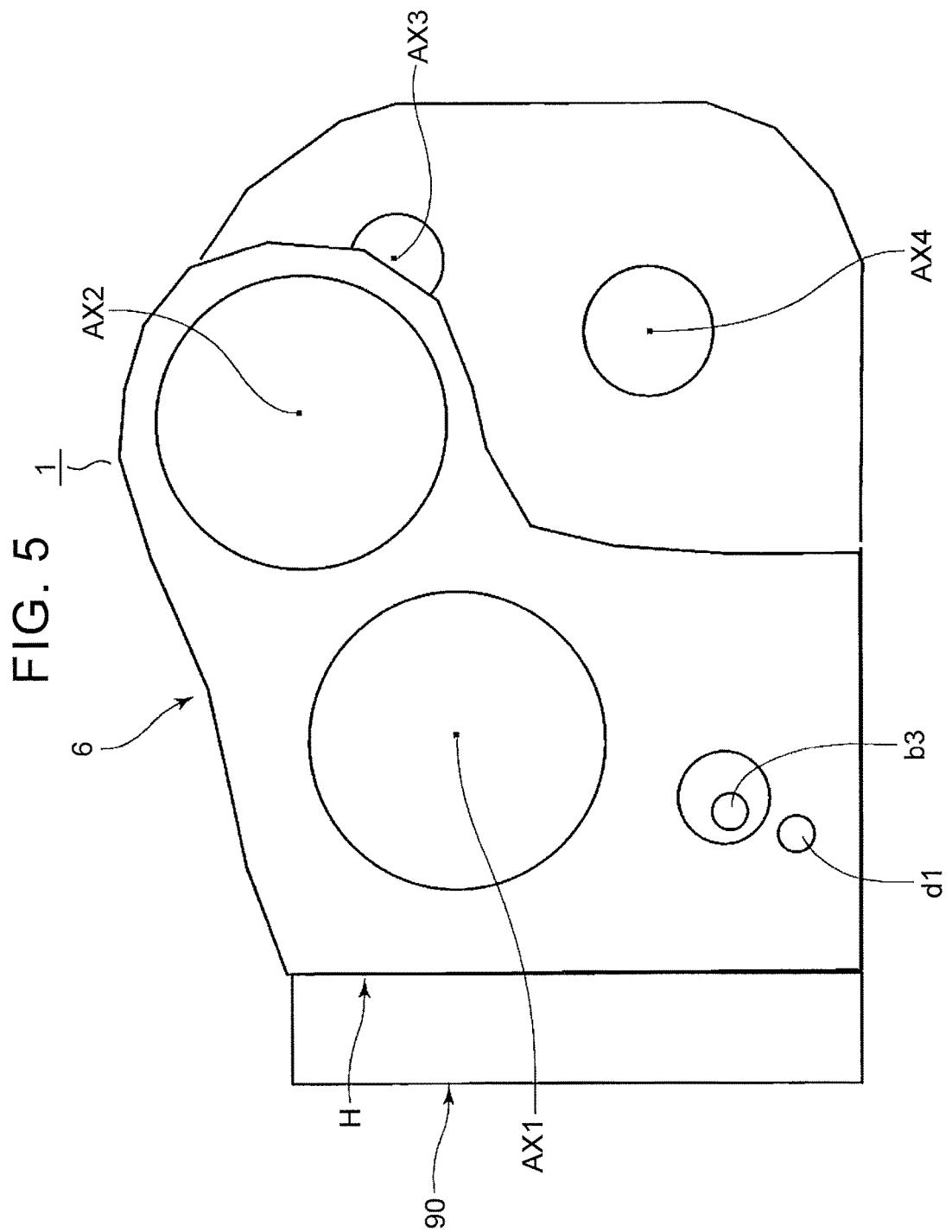
FIG. 5 is a schematic rear view with an electric oil pump of FIG. 4 removed.

FIG. 5 is a schematic rear view with the electric oil pump 70 of FIG. 4 removed. As illustrated in FIG. 5, in the transmission case 6, a connection portion of the second oil passage b3 of the suction oil passage is formed toward the electric oil pump 70 (toward the side opposite to the internal combustion engine side in the axial direction), and a connection portion of the second discharge oil passage d1 is formed toward the electric oil pump 70.

Figure 6:
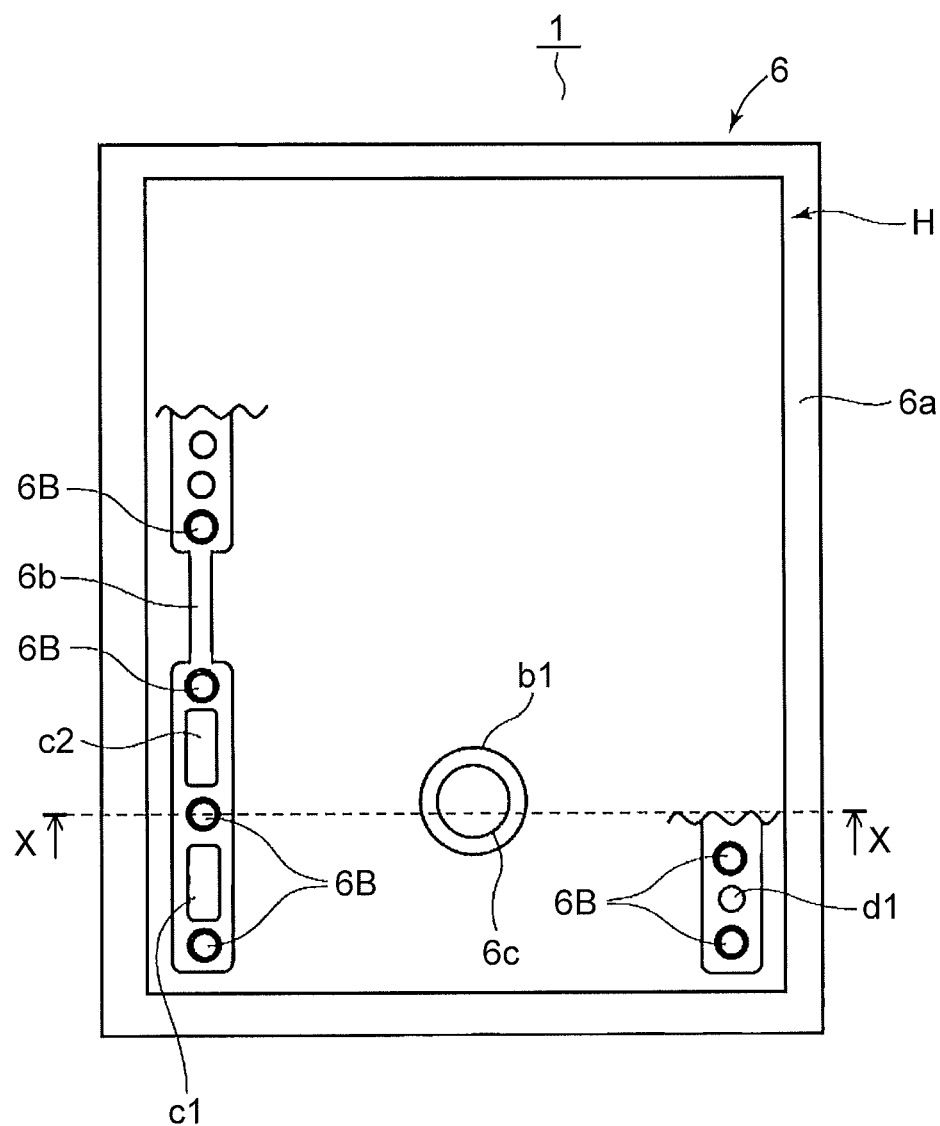
FIG. 6 is a schematic side view with a hydraulic control device of the automatic transmission removed.

FIG. 6 is a side view (a view as viewed from a direction orthogonal to the axial direction) with the hydraulic control device 90 of the automatic transmission 1 removed. As illustrated in FIG. 6, in the transmission case 6, connection portions of the common oil passage b1 of the suction oil passage, the first discharge oil passages c1 and c2 extending from the mechanical oil pump 60, and the second discharge oil passage d1 extending from the electric oil pump 70 are formed as openings toward the hydraulic control device 90, in the joining section H to which the hydraulic control device 90 is joined.

More specifically, the joining section H includes a fastening face 6a that defines an outer peripheral portion and is sealed in contact with the hydraulic control device 90; joining faces 6b and 6b that are disposed on the inner side with respect to the fastening face 6a on the outer edge side of the joining section H and that are formed when oil passages including the first discharge oil passages c1 and c2 and the second discharge oil passage d1 are sealed by being joined to the hydraulic control device 90 by bolts (not illustrated) threaded into a plurality of bolt holes 6B; and a joining face 6c that is disposed on the center side with respect to the joining faces 6b and 6b through which the first discharge oil passages c1 and c2 and the second discharge oil passage d1 pass and that is formed when the common oil passage b1 of the suction oil passage is sealed by being joined to the hydraulic control device 90.

Note that the oil passages that pass through the joining faces 6b and 6b includes not only the first discharge oil passages c1 and c2 and the second discharge oil passage d1, but also oil passages for conducting relatively high hydraulic pressure such as engagement pressure of the clutch C, the engagement pressure of the brake B, primary sheave pressure of the hydraulic servo 12 that presses the movable sheave 11b of the primary pulley 11, and secondary sheave pressure of the hydraulic servo 14 that presses the movable sheave 13b of the secondary pulley 13. The pressure in these oil passages becomes high. However, since the joining faces 6b and 6b are disposed on the outer edge side close to the fastening face 6a in the joining section H, the oil passages are held in relatively tight contact by the fastening force on the fastening face 6a fastened by the bolts (not illustrated) threaded into the plurality of bolt holes 6B, and therefore it is possible to ensure the sealing performance. On the other hand, the pressure in the common oil passage b1 of the suction oil passage is as relatively low as the excess pressure conducted therethrough. Therefore, although the common oil passage b1 is away from the fastening face 6a and is on the center side with a low fastening force, this does not affect particularly the sealing performance.

Figure 7:
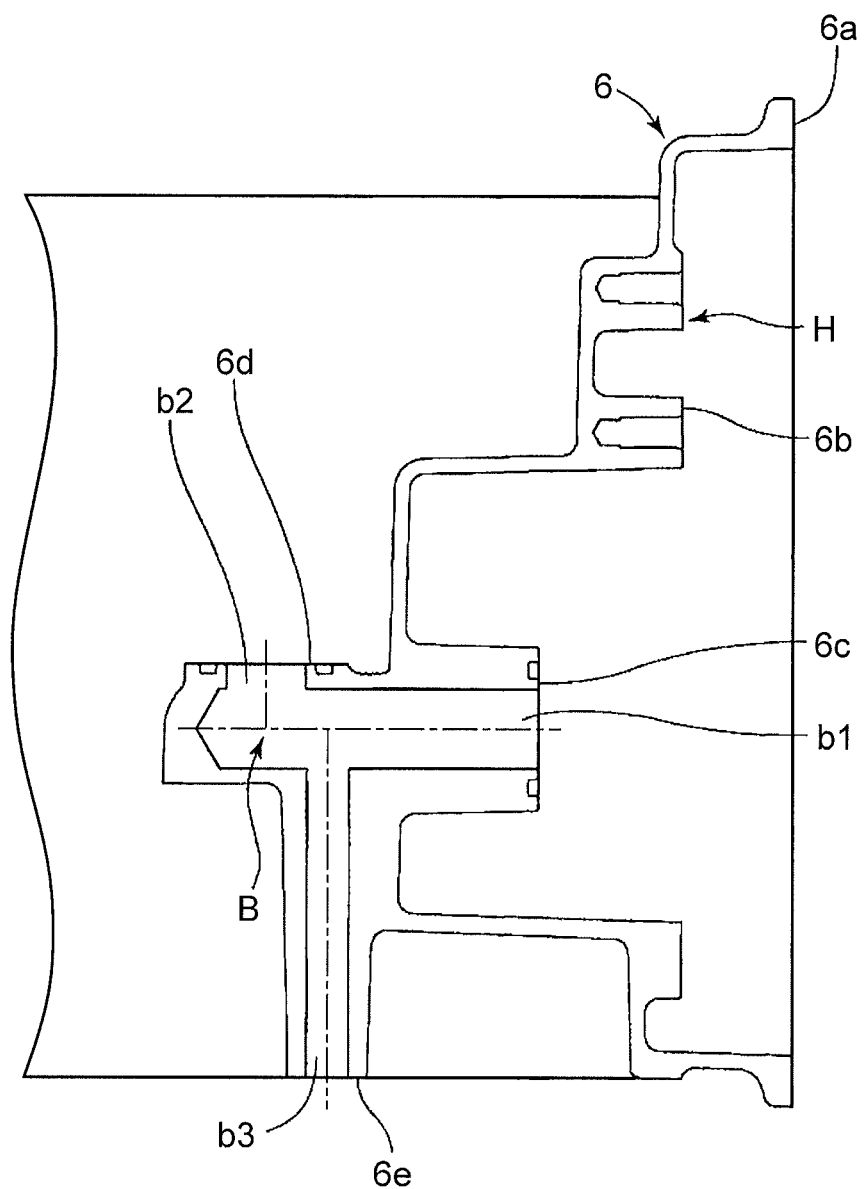
FIG. 7 is a cross-sectional view taken in the direction of the arrows along the line X-X of FIG. 6.

FIG. 7 is a cross-sectional view taken in the direction of the arrows along the line X-X of FIG. 6. As illustrated in FIG. 7, the common oil passage b1 of the suction oil passage is formed such that only a single oil passage extends from the hydraulic control device 90 to the inside of the transmission case 6 in the front-back direction (a direction orthogonal to the axial direction) when mounted on a vehicle. The branch point B is formed at the distal end portion of the common oil passage b1, and the first oil passage b2 and the second oil passage b3 are formed so as to extend from the branch point B in the axial direction of the speed change mechanism 2. That is, the mechanical oil pump 60 is joined and disposed on a joining face 6d formed in an opening portion of the first oil passage b2, and the electric oil pump 70 is joined and disposed on a joining face 6e formed in the opening portion in the second oil passage b3. In this manner, the branch point B of the suction oil passage is disposed on the center side of the transmission case 6, that is, between the mechanical oil pump 60 and the electric oil pump 70 in the axial direction.

Accordingly, in the suction oil passage, since the branch point B thereof is disposed inside the transmission case 6, the excess pressure is guided to the inside of the transmission case 6 by the single common oil passage b1. Then, the excess pressure is guided from the branch point B to the suction side of the mechanical oil pump 60 via the first oil passage b2, and is also guided from the branch point B to the electric oil pump 70 via the second oil passage b3. Further, when the electric oil pump 70 is driven before the internal combustion engine is stopped, or when the electric oil pump 70 is driven while the internal combustion engine is stopped, the oil suctioned from the strainer 80 passes through the inside of the pump body 60B of the mechanical oil pump 60 (see FIG. 9), passes through the first oil passage b2, the branch point B, and the second oil passage b3, and is guided to the suction side of the electric oil pump 70.

As described above, the vehicle drive apparatus (1) (see, for example, FIGS. 1 through 10) includes:

a case (6) that accommodates a transmission apparatus (2);

a mechanical oil pump (60) that is disposed in the case (6) and is driven by an internal combustion engine;

an electric oil pump (70) that is disposed in the case (6) and is electrically driven;

a hydraulic control device (90) that is joined and attached to the case (6), and hydraulically controls the transmission apparatus (2) based on hydraulic pressures generated by the mechanical oil pump (60) and the electric oil pump (70);

a strainer (80) that is disposed inside the case (6);

a first discharge oil passage (c1, c2) that supplies the hydraulic pressure discharged by the mechanical oil pump (60) to the hydraulic control device (90);

a second discharge oil passage (d1) that supplies the hydraulic pressure discharged by the electric oil pump (70) to the hydraulic control device (90); and a suction oil passage (b1, b2, b3) that returns an excess hydraulic pressure in the hydraulic control device (90) to the mechanical oil pump (60) and the electric oil pump (70);

wherein the suction oil passage includes a common oil passage (b1) extending from the hydraulic control device (90) to an inside of the case (6), a branch point (B) where the common oil passage (b1) splits toward the mechanical oil pump (60) and the electric oil pump (70), a first oil passage (b2) extending from the branch point (B) to the mechanical oil pump (60), and a second oil passage (b3) extending from the branch point (B) to the electric oil pump (70), and the common oil passage (b1), the branch point (B), the first oil passage (b2), and the second oil passage (b3) are formed in the case (6);

wherein the mechanical oil pump (60) includes a hydraulic pressure generating unit (63) that generates the hydraulic pressure, and a pump body (60B) which contains the hydraulic pressure generating unit (63) and in which an inlet port (60a) for suctioning oil from an oil reservoir via the strainer (80), a discharge port (60b) communicating with the first discharge oil passage (c1, c2), and a suction connection port (60c) communicating with the first oil passage (b2) of the suction oil passage are formed; and wherein a meeting point (C) where the inlet port (60a) and the suction connection port (60c) meet is provided inside the pump body (60B).

Thus, the common oil passage b1, the branch point B, the first oil passage b2, and the second oil passage b3 of the suction oil passage are formed in the transmission case 6, and the meeting point C where the inlet port 60a for suctioning oil via the strainer 80 and the suction connection port 60c communicating with the first oil passage b2 of the suction oil passage meet is provided inside the pump body 60B of the mechanical oil pump 60. Accordingly, the suction oil passage of the mechanical oil pump 60 and the inlet oil passage of the electric oil pump 70 can have a portion in common at the first oil passage b2, in particular, and therefore it is possible to prevent an increase in the size of the automatic transmission 1. Further, the meeting point C where the inlet port 60a and the suction connection port 60c meet is provided inside the pump body 60B of the mechanical oil pump 60. Accordingly, the arrangement of oil passages inside the transmission case 6 is improved compared to the case where, for example, an inlet oil passage for guiding oil from the strainer 80 to the mechanical oil pump 60 is diverted to the suction oil passage and then connected, and therefore it is possible to prevent an increase in the size of the automatic transmission 1.

Further, the vehicle drive apparatus (1) (see, for example, FIG. 6) according to preferred embodiments, wherein in a joining section (H) between the case (6) and the hydraulic control device (90), the common oil passage (b1) of the suction oil passage is disposed so as to pass through a center side with respect to the first discharge oil passage (c1, c2) and the second discharge oil passage (d1).

Thus, in the joining section H between the transmission case 6 and the hydraulic control device 90, the common oil passage b1 of the suction oil passage is disposed so as to pass through the center side with respect to the first discharge oil passages c1 and c2 and the second discharge oil passage d1. Thus, the common oil passage b1 of the suction oil passage with low pressure can be disposed on the center side. Accordingly, when the hydraulic control device 90 is fastened to the transmission case 6 at the outer edge side, the common oil passage b1 of the suction oil passage that requires only a low level of sealing performance can be disposed on the center side. Further, since the common oil passage b1 of the suction oil passage is not disposed on the outer edge side of the joining section H, the number of oil passages disposed on the outer edge side of the joining section H (oil passages passing through the joining faces 6b) can be reduced, and the area of the joining section H between the transmission case 6 and the hydraulic control device 90 can be reduced. Therefore, it is possible to prevent an increase in the size of the automatic transmission 1.

Further, since the common oil passage b1 of the suction oil passage is disposed on the center side of the joining section H, the branch point B of the suction oil passage can be disposed near the center of the transmission case 6. Thus, it is possible to prevent an increase in the length of the first oil passage b2 extending from the branch point B of the suction oil passage to the mechanical oil pump 60 and the length of the second oil passage b3 extending from the branch point B to the electric oil pump 70. Accordingly, the arrangement of oil passages inside the transmission case 6 is improved, and therefore it is possible to prevent an increase in the size of the automatic transmission 1.

Further, the vehicle drive apparatus (1) (see, for example, FIGS. 2 through 7) according to preferred embodiments, wherein the mechanical oil pump (60) is disposed on one side of the branch point (B) of the suction oil passage in an axial direction of the transmission apparatus (2) and the electric oil pump (70) is disposed on the other side in the axial direction with the branch point (B) of the suction oil passage provided therebetween.

Thus, since the mechanical oil pump 60 is disposed on one side of the branch point B of the suction oil passage in an axial direction of the speed change mechanism 2 and the electric oil pump 70 is disposed on the other side in the axial direction with the branch point (B) of the suction oil passage provided therebetween, it is possible to prevent an increase in the length of the first oil passage b2 extending from the branch point B of the suction oil passage to the mechanical oil pump 60 and the length of the second oil passage b3 extending from the branch point B to the electric oil pump 70. Accordingly, the arrangement of oil passages inside the transmission case 6 is improved, and therefore it is possible to prevent an increase in the size of the automatic transmission 1.

Further, the vehicle drive apparatus (1) (see, for example, FIGS. 7 through 9) according to preferred embodiments, wherein the inlet port (60a) and the suction connection port (60c) of the mechanical oil pump (60) are disposed on a side of the branch point (B) of the suction oil passage with respect to the hydraulic pressure generating unit (63).

Thus, since the inlet port 60a and the suction connection port 60c of the mechanical oil pump 60 are disposed on the side of the branch point B of the suction oil passage with respect to the internal gear pump 63, it is possible to simplify the arrangement of oil passages inside the pump body 60B, and to reduce the size of the pump body 60B of the mechanical oil pump 60. Therefore, it is possible to prevent an increase in the size of the automatic transmission 1.

Further, the vehicle drive apparatus (1) (see, for example, FIG. 6) according to preferred embodiments, wherein in a joining section (H) between the case (6) and the hydraulic control device (90), the first discharge oil passage (c1, c2) and the second discharge oil passage (d1) are disposed so as to pass through an outer edge side thereof.

Thus, in the joining section H between the transmission case 6 and the hydraulic control device 90, the first discharge oil passages c1 and c2 and the second discharge oil passage d1 are disposed so as to pass through the outer edge side thereof. That is, the first discharge oil passages c1 and c2 and the second discharge oil passage d1 with high pressure can be disposed on the outer edge side of the joining section H. Accordingly, when the hydraulic control device 90 is fastened to the transmission case 6 at the outer edge side, the first discharge oil passages c1 and c2 and the second discharge oil passage d1 can be disposed on locations where the sealing performance is improved by the fastening force.

In the case where oil is suctioned from the strainer 80 via the hydraulic control device 90, an inlet oil passage passes through the hydraulic control device 90 and the joining section H between the transmission case 6 and the hydraulic control device 90, which might result in an increase in the size of the hydraulic control device 90 and the automatic transmission 1. On the other hand, according to the present embodiment described above, the hydraulic control device 90 is attached to a side surface of the transmission case 6, and the strainer 80 is disposed inside the transmission case 6. Accordingly, oil can be suctioned from the strainer 80 directly into the mechanical oil pump 60 and the electric oil pump 70. Thus, since the inlet oil passage does not pass through the hydraulic control device 90, it is possible to prevent an increase in the size of the hydraulic control device 90, and thus to prevent an increase in the size of the automatic transmission 1.

Note that, in the present embodiment described above, the automatic transmission 1 that is suitably applied to a front-engine, front-wheel-drive (FF) (transverse engine) vehicle including a belt-type continuously variable transmission mechanism and a reduction gear mechanism has been described as an example of the vehicle drive apparatus. However, the prevent invention is not limited thereto. For example, the vehicle drive apparatus may be a multi-stage automatic transmission, a belt-type or toroidal-type continuously variable transmission, or the like. Further, the vehicle drive apparatus may be an automatic transmission that is suitably applied to a front-engine, rear-wheel-drive (FR) (longitudinal engine) vehicle other than an FF vehicle. That is, the vehicle drive apparatus may be any automatic transmission that is used in a vehicle with an idling stop function and is equipped with an electric oil pump. Further, this technique is applicable to any vehicle drive apparatus that includes a mechanical oil pump and an electric oil pump, and therefore the vehicle drive apparatus may be one for a hybrid drive apparatus, for example.

Further, in the present embodiment, the mechanical oil pump is one that uses an internal gear pump, and the electric oil pump is one that uses a vane pump. However, the present invention is not limited thereto. The hydraulic pressure generating unit may be any type of pump, such as the external gear type and the crescent internal gear.

Further, in the present embodiment, two first discharge oil passages c1 and c2 are provided for discharging a hydraulic pressure from the mechanical oil pump 60 to the hydraulic control device 90. However, only one first discharge oil passage may be provided.

Further, in the present embodiment, the arrangement of the mechanical oil pump, the electric oil pump, and the oil passages illustrated in FIGS. 2 through 9 has been described as a specific example. However, the present invention is not limited thereto, and the design of the arrangement structure may be changed. For example, the mechanical oil pump and the electric oil pump may be arranged in parallel in the axial direction; the axial positions of the mechanical oil pump and the electric oil pump may be switched; or the orientations thereof may be switched.

Further, in the present embodiment, the structure has been described in which the strainer 80 is disposed inside the transmission case 6. However, another structure may be employed in which a strainer is attached outside a transmission case, that is, the hydraulic control device is attached under the transmission case and an oil pan is attached under the hydraulic control device such that the strainer is disposed inside the oil pan. In this case, an inlet oil passage for suctioning oil from the strainer may be merged into the common oil passage of the suction oil passage such that the single common oil passage is guided to the inside of the transmission case 6.

DESCRIPTION OF THE REFERENCE NUMERALS 1 vehicle drive apparatus (automatic transmission)
2 transmission apparatus (speed change mechanism)
6 case (transmission case)
60 mechanical oil pump
60B pump body
60a inlet port
60b discharge port
60c suction connection port
63 hydraulic pressure generating unit (internal gear pump)
70 electric oil pump
80 strainer
90 hydraulic control device
B branch point
C meeting point
H joining section
b1 suction oil passage, common oil passage
b2 suction oil passage, first oil passage
b3 suction oil passage, second oil passage
c1, c2 first discharge oil passage
d1 second discharge oil passage

The invention claimed is:

1. A vehicle drive apparatus comprising:
a case configured to accommodate a transmission apparatus;
a mechanical oil pump that is disposed in the case and is configured to be driven by an internal combustion engine;
an electric oil pump that is disposed in the case and is configured to be electrically driven;
a hydraulic control device that is joined and attached to the case, and hydraulically controls the transmission apparatus based on hydraulic pressures generated by the mechanical oil pump and the electric oil pump;
a strainer that is disposed inside the case;
a first discharge oil passage that supplies the hydraulic pressure discharged by the mechanical oil pump to the hydraulic control device;
a second discharge oil passage that supplies the hydraulic pressure discharged by the electric oil pump to the hydraulic control device; and
a suction oil passage that returns an excess hydraulic pressure in the hydraulic control device to the mechanical oil pump and the electric oil pump, wherein:
the suction oil passage includes a common oil passage extending from the hydraulic control device to an inside of the case, a branch point where the common oil passage splits toward the mechanical oil pump and the electric oil pump, a first oil passage extending from the branch point to the mechanical oil pump, and a second oil passage extending from the branch point to the electric oil pump, and the common oil passage, the branch point, the first oil passage, and the second oil passage are formed in the case;
the mechanical oil pump includes a hydraulic pressure generating unit that generates the hydraulic pressure, and a pump body which contains the hydraulic pressure generating unit and in which an inlet port for suctioning oil from an oil reservoir via the strainer, a discharge port communicating with the first discharge oil passage, and a suction connection port communicating with the first oil passage of the suction oil passage are formed; and
a meeting point where the inlet port and the suction connection port meet is provided inside the pump body.

2. The vehicle drive apparatus according to claim 1, wherein in a joining section between the case and the hydraulic control device, the common oil passage of the suction oil passage is disposed so as to pass through a center side with respect to the first discharge oil passage and the second discharge oil passage.

3. The vehicle drive apparatus according to claim 2, wherein the mechanical oil pump is disposed on one side of the branch point of the suction oil passage in an axial direction of the transmission apparatus and the electric oil pump is disposed on the other side in the axial direction with the branch point of the suction oil passage provided therebetween.

4. The vehicle drive apparatus according to claim 3, wherein the inlet port and the suction connection port of the mechanical oil pump are disposed on a side of the branch point of the suction oil passage with respect to the hydraulic pressure generating unit.

5. The vehicle drive apparatus according to claim 4, wherein in a joining section between the case and the hydraulic control device, the first discharge oil passage and the second discharge oil passage are disposed so as to pass through an outer edge side thereof.

6. The vehicle drive apparatus according to claim 1, wherein the inlet port and the suction connection port of the mechanical oil pump are disposed on a side of the branch point of the suction oil passage with respect to the hydraulic pressure generating unit.

7. The vehicle drive apparatus according to claim 1, wherein the mechanical oil pump is disposed on one side of the branch point of the suction oil passage in an axial direction of the transmission apparatus and the electric oil pump is disposed on the other side in the axial direction with the branch point of the suction oil passage provided therebetween.

8. The vehicle drive apparatus according to claim 2, wherein the inlet port and the suction connection port of the mechanical oil pump are disposed on a side of the branch point of the suction oil passage with respect to the hydraulic pressure generating unit.

9. The vehicle drive apparatus according to claim 7, wherein the inlet port and the suction connection port of the mechanical oil pump are disposed on a side of the branch point of the suction oil passage with respect to the hydraulic pressure generating unit.

10. The vehicle drive apparatus according to claim 1, wherein in a joining section between the case and the hydraulic control device, the first discharge oil passage and the second discharge oil passage are disposed so as to pass through an outer edge side thereof.

11. The vehicle drive apparatus according to claim 2, wherein in a joining section between the case and the hydraulic control device, the first discharge oil passage and the second discharge oil passage are disposed so as to pass through an outer edge side thereof.

12. The vehicle drive apparatus according to claim 3, wherein in a joining section between the case and the hydraulic control device, the first discharge oil passage and the second discharge oil passage are disposed so as to pass through an outer edge side thereof.

13. The vehicle drive apparatus according to claim 6, wherein in a joining section between the case and the hydraulic control device, the first discharge oil passage and the second discharge oil passage are disposed so as to pass through an outer edge side thereof.

14. The vehicle drive apparatus according to claim 8, wherein in a joining section between the case and the hydraulic control device, the first discharge oil passage and the second discharge oil passage are disposed so as to pass through an outer edge side thereof.

15. The vehicle drive apparatus according to claim 9, wherein in a joining section between the case and the hydraulic control device, the first discharge oil passage and the second discharge oil passage are disposed so as to pass through an outer edge side thereof.

* * * * *